July 26, 1960 P. P. DUSINA, JR., ET AL 2,946,713
PROCESS FOR EMBOSSING DECORATIVE ARTICLES
Filed Oct. 6, 1955

INVENTORS
Ralph M. Stallard &
BY Peter P. Dusina, Jr.
S. E. Ross
ATTORNEY

United States Patent Office 2,946,713
Patented July 26, 1960

2,946,713

PROCESS FOR EMBOSSING DECORATIVE ARTICLES

Peter P. Dusina, Jr., St. Clair Shores, and Ralph M. Stallard, Detroit, Mich., assignors to General Motors Corporation, Detroit, Mich., a corporation of Delaware Filed Oct. 6, 1955, Ser. No. 538,914

14 Claims. (Cl. 154—106)

This invention relates to a process for embossing decorative articles and to the product resulting therefrom, and more particularly to a process for dielectric embossment of sponge rubber without the use of adhesives.

In the manufacture of decorative trim assemblies, it has been the practice to provide depressed trim lines in the trim material by an embossing operation whereby, in those instances where the assembly comprises a trim material positioned on a riser or filler material, the desired design is impressed on the assembly by application of pressure and heat to permanently compress the riser or filler material, the trim material being bonded thereto and similarly depressed in corresponding portions. One such method uses a dielectric press to apply heat and pressure to an assembly comprising a trim material positioned on a cotton padding riser layer which is impregnated with a heat-fusible plastic and is supported on a fiber board backing. Upon operation of the press an embossed pattern is produced wherein the trim material is bonded to the base sheet through the riser, the plastic in the riser along the embossed lines having been melted and cured, thus serving as the bonding adhesive.

Such a method has several inherent serious problems. The process and resulting product are costly by reason of the need for a specially prepared riser material having permeable properties even when compressed (to enable the adhesive to penetrate therethrough) and the need for an adhesive material having peculiar electrical properties to enable it to be selectively heated dielectrically. Likewise, the resulting bond is generally hard and lacking in flexibility with a tendency to break loose when subjected to hard wear as in the back rest and seat panels of automobiles. Also, the plastic on the riser in the elevated portions of the embossed design tends to powder and the resultant dust creates a strike through problem, especially where the trim is a cloth. Further, the definition or sharpness of the embossed pattern is imperfect by reason of the heating effects in portions of the assembly adjacent the embossing blades.

It is therefore an object of our invention to provide a simple and inexpensive process for embossing a trim assembly. It is another object of our invention to provide a process for embossing whereby both the elevated and depressed portions of the trim material are tooled. It is another object of our invention to provide a process for embossing a trim assembly wherein the definition of the design is sharp and clear. It is another object of our invention to provide a process for embossing wherein the bond between the several materials of the assembly along the embossed line is both soft and strong. It is another object of our invention to provide a process for dielectrically embossing a sponge rubber trim assembly wherein the sponge material acts both as the riser and as the adhesive. It is another object of our invention to provide an embossed trim assembly wherein both the elevated and the depressed portions of the design are tooled.

It is another object of our invention to provide an embossed assembly wherein the elevated portions of the design adjacent the embossed lines are sharp and clearly distinguished from the depressed portions. It is a further object of our invention to provide an embossed sponge rubber trim assembly wherein sponge material in the embossed lines bonds the trim material to the backing sheet without benefit of adhesives.

These and other objects of our invention are achieved by providing the sponge rubber of the trim assembly with a conditioning material so as to enable the fusion of the sponge material in the depressed area during the dielectric heating operation.

For a more complete understanding of our invention, reference should be had to the following description taken in conjunction with the accompanying drawing in which.

Dielectric heating is a selective heating process whereby heat is developed internally in an electrical insulating material by frictional heating brought about by the rotating and oscillating movement of the atoms and molecules of the insulator and the materials contained therein under the influence of an alternating current field. It is obvious that the more rapidly the current field alternates, the faster the movement and the more heat generated in the material. In practice, the frequency utilized for dielectric heating is in the range of two megacycles to 200 megacycles per second.

It has been found that the amount of heat actually developed in an insulating material when heated dielectrically depends on (1) The composition and physical characteristics of the material.
(2) The voltage placed across the material.
(3) The frequency of the alternating voltage.
(4) The time the voltage is applied.
(5) The rate of heat loss.

Likewise, it has been found that the suitability of any particular insulating material for dielectric heating is defined by the following factors:

(1) Dielectric constant (a measure of the capacity of the material to store electrical energy when subjected to an alternating current field)

(2) Power factor (measure of the amount of energy "lost" in the material by conversion to heat on changing of the current field)

(3) Dielectric strength (the amount of voltage the material can withstand before breaking down or arcing over. It is of extreme importance not to exceed the dielectric strength of the materials used in embossing dielectrically, since this would not only burn holes in the trim assembly but may also burn the costly embossing plates).

Figure 1:
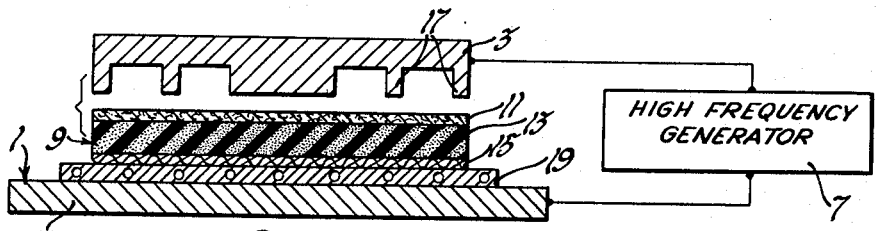
Figure 1 shows a trim assembly positioned in a dielectric press preparatory to embossment, the view being shown on a vertical section and generally schematic.
Figure 2:
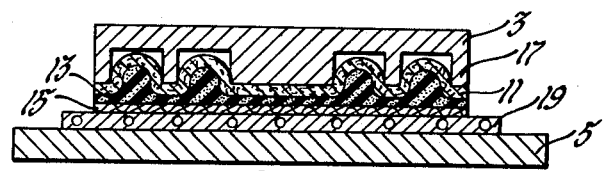
Figure 2 is a view similar to Figure 1 showing the several parts during the embossing operation.
Figure 3:
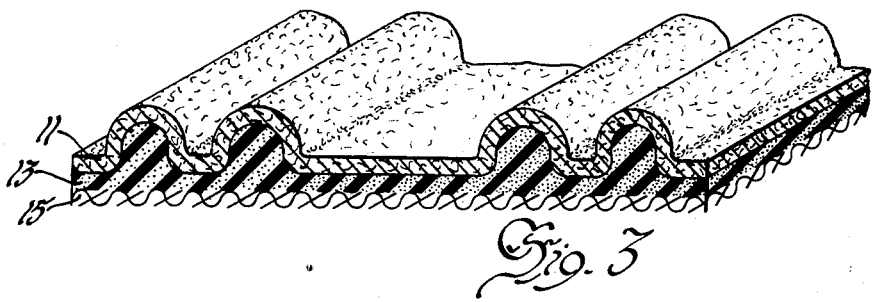
Figure 3 is an enlarged view in perspective of the embossed article resulting from the process of our invention.

Referring now to Figure 1, there is schematically shown a dielectric press 1 having upper and lower platens 3 and 5, respectively, in series with a high frequency generator 7. Positioned within the press 1 is a laminated trim assembly 9 comprising a sheet of trim material 11 positioned on a layer of riser material 13 formed of a sponge rubber and having a backing sheet 15 secured thereto. The trim assembly 9 is positioned on the flat surfaced platen 5. A porous or open mesh sheet material is interposed between the platen and the lower surface of the assembly for a purpose more fully described hereinafter. As is clearly shown in Figures 1 and 2, the upper platen 3 is formed to serve as the embossing die by providing a plurality of embossing blades 17 thereon. The blades 17 are set on edge in the desired trim line pattern and are thus adapted to impart the depressed pattern or design to the trim assembly by application of pressure and heat upon the closing of the press and the actuation of the high frequency generator 7.

By "backing sheet" or other similar descriptive term we mean to include flexible materials such as fabrics formed of cotton, wool, rayon, glass fibers, synthetic fibers, etc., paper, leather, etc. as well as rigid and semi-rigid materials such as composition board, fiber board, paper laminates, synthetic sheets and metals; by "trim material" we mean to include leather, plastic materials, i.e., the vinyl chloride, vinylidene chloride, and other similar synthetics formed into flexible sheets with finishes simulating leather, woven fabrics, etc., and cloth materials formed of woven fibers of the natural, synthetic and glass type; by the term "sponge rubber" we mean to specify the soft, cellular, sponge-like material which exhibits highly resilient properties and quickly recovers its shape and form when deforming pressure is removed therefrom. Such materials may be formed of natural rubber, various synthetic materials, as for example, butyl rubber, the vinyl chloride resins, neoprene, isocyanate resins, etc., and mixtures of natural rubber and/or such synthetic materials.

We have discovered that sponge rubber may be dielectrically embossed without the use of adhesive materials by the addition thereto of a conditioning material such as water and alcohol, i.e., methyl and the higher alcohols, and other suitable materials having the properties outlined hereinafter and being compatible with the materials of the trim assembly. We have discovered that upon dielectrically embossing sponge rubber having such conditioning material substantially uniformly distributed therethrough in a controlled amount, the sponge material compressed under the embossing blades tends to fuse. The fused material serves as the adhesive or bonding material between the trim sheet 11 and the backing sheet 15, if utilized, to retain the depressed design in both the riser material 13 and the trim material 11. By the term "fuse" or other similar descriptive word we mean to include not only the substantially total fusion of the sponge rubber but also the partial fusion of the sponge rubber under the embossing blades 17 to produce a highly compressed sponge having a cellular structure much smaller than that originally possessed, such highly compressed structure being substantially irreversible.

We have found that the embossment of sponge rubber assemblies in accordance with our discoveries results in an embossed article not only having a strong and highly pliable bond in the embossed line but also in an embossed pattern having good definition. This is due to the fact that not only are the riser and trim materials 13 and 11, respectively, tooled in the depressed areas by the embossing blades but that the trim material is also tooled in the elevated areas by the hot vapors of the conditioning material escaping into the elevated portions from the dielectrically heated depressed portions. The degree of tooling in the elevated areas may be conveniently controlled by providing a vapor escape open mesh sheet 19 between the flat surfaced platen 5 and the bottom surface of the trim assembly 9. By using one or more of such open mesh sheets 19 and by varying the mesh thereof, the rate of escape of the steam vapors is controlled. The vapor escape sheets 19 may be formed of any suitable material such as glass cloth, aluminum, copper and other metallic screening, cotton duck and other porous woven or pressed materials. Such sheets should have the properties of retaining their porosity under application of pressures in order of 500 p.s.i. and of being chemically inert when subjected to the hot vapors of the conditioning material. It is especially important to control the vapor escape rate when working with such trim materials as genuine leather and the plastics since it has been found that such materials have a tendency to blister and/or harden and dry out when the vapor is not removed at a rapid enough rate.

We have likewise found that we may obtain greatly improved definition in the embossed design by providing the sponge rubber with an additive material such as soaps, organic sulphonates such as found in the detergent soaps. These materials along with such other suitable compounds as are compatible with the materials of the trim assembly have an added function in that they are readily ionizable in the presence of water or other conditioning material and thereby act to more quickly raise the temperature of the sponge rubber in the dielectric heating operation. The precise action of such additives on the sponge rubber immediately adjacent to the compressed rubber under the embossing blades 17 is not known, however, it is theorized that such materials have a sufficient lubricating action to preclude any substantial change in the sponge rubber structure. Where such additive materials are present the elevated portions of the embossed pattern are sharply separated from the depressed portions thereof thus making it possible to use highly intricate embossed patterns without loss of attractive detail.

As pointed out above, the dielectric embossing process is based on the selective heating of an insulating material in an alternating current field. The dielectric embossment of sponge rubber has not been possible heretofore because of the fact that the electrical characteristics of the material were such as to preclude its being selectively heated in a trim assembly of the type herein discussed. Likewise, it has been substantially impossible to impregnate the sponge rubber with an adhesive such as a phenolic resin which is adapted to be selectively heated in an alternating current field. To illustrate this point, it may be noted that it has been found that the power factor for materials which are successfully heated dielectrically is between 0.1 to 1.0 for frequencies above 1 megacycle. Sponge rubber on the other hand has been found to have a power factor of approximately 0.04 when tested without being provided with a conditioning material such as water.

Figure 4:
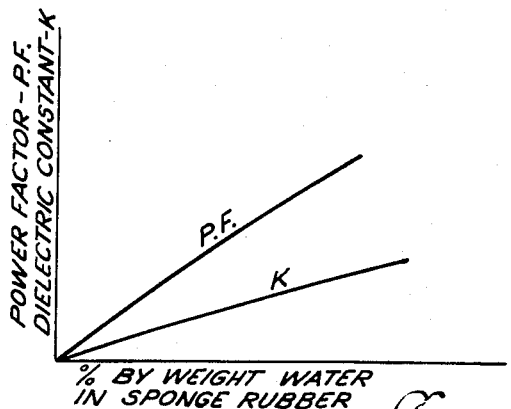
Figure 4 is a graphic representation of the electrical factors effecting the operation of our process.

In Figure 4 there is shown graphically the relative relationships of the power factor and the dielectric constant of the sponge rubber with reference to the use of water as the conditioning material. It will be noted from the graph that the power factor increases with the increase in water content at a greater rate than does the dielectric constant, thus indicating that sponge rubber conditioned with water may be selectively heated.

We have found that a moisture content of from 2 to 7% by weight of the sponge rubber produces a riser material suitable for dielectric embossing. We have likewise found that a moisture content of from 4 to 5% was optimum under substantially all operating conditions such as are set forth hereinafter. In this regard, we have found that a moisture content above 5% acted to decrease the efficiency of the process because of the waste in power in generating excessive steam. Correspondingly, a moisture content below 2% reduced the power factor to a point where the heating selectivity was lost. As previously stated, we have found that the water alters the electrical properties of the rubber so that selective heating may be otbained. At the same time, it appears that the presence of the water and/or water vapor acts to enable the sponge rubber to fuse under the influence of heat and applied pressure. Further, we have found that the generated vapor acts to tool and highlight the embossed effect in its action on the trim material in the elevated portions of the design.

We have likewise found that a very satisfactory embossed pattern is obtained by applying a pressure of from about 200 to 600 p.s.i., a pressure of about 400 p.s.i. being suitable in substantially all instances. Embossing pressure serves two functions, that of obtaining adequate bond strength and that of imparting good definition to the embossed design. In our process for embossing sponge rubber, the application of embossing pressure is compatible with both functions. This is not always the case where the addition of adhesives to the riser material was required since the compression of the riser material frequently acted to inhibit the free flow of the adhesive material therethrough with the result that the bond strength was weakened.

The dielectric embossing cycle comprises two phases from the time standpoint, the length of time during which dielectric heating takes place (the heat cycle) and the length of time that pressure is maintained on the embossed assembly after the heating is accomplished (hold time or soak time). The thermal efficiency of the dielectric heating process is improved as the heat cycle is decreased since the thermal efficiency is a function of the heat loss per unit of time, loss of heat taking place by conduction through the materials of the trim assembly to the embossing blades and flat surfaced electrode of the press. We have found that a heat cycle of from 6 to 60 seconds and a hold time of up to 10 seconds was satisfactory. However, from the standpoint of maximum efficiency, we prefer to use a heat cycle of from about 12 to 25 seconds, about an 18-second heating cycle being suitable in most instances along with a hold time of from 1 to 2 seconds. The peak temperature reached during the heat cycle is from about 275 to 350° F., a temperature of about 325° F. being typical.

With regard to the voltage employed in our process, it is well known that the amount of electrical power absorbed in the insulator material and therefore the heat generated therein is dependent upon the voltage across the material, the heat generated varying as the square of the voltage. It is therefore the practice to use as high a voltage as possible in order to obtain the maximum heating effect in the shortest time possible. The limiting factor on the voltage, however, is the dielectric strength of the materials being embossed and the corona discharge effect which causes arcing along the surface of the materials. We have found that a voltage of from 600 to 1200 volts across the trim assembly is satisfactory, the preferred voltage being about 1000 volts. Likewise, the frequency of the alternating current field is directly related to the generation of heat in the trim assembly. The higher the frequency, the more heat developed, the relationship therebetween being 1:1. Too high a frequency may not be used, however, since the standing wave losses in the equipment increases rapidly as the frequency is raised. We have found that a frequency of about 15 megacycles per second is admirably suited to our process.

In making up the sponge rubber trim assembly for use in accordance with our invention, it was found advisable to provide the sponge rubber with a small but sufficient amount of additive material such as described hereinbefore, i.e., preferably soap, sodium or potassium salts of fatty acids or mixtures thereof, or detergents such as the benzene or naphthalene sulfonates or the sulfate of lauryl alcohol, in order to obtain optimum definition in the embossed pattern. The addition of such material is conveniently made in the course of forming the sponge rubber. In those instances where the purchased sponge rubber does not contain such materials, the addition may be made in the form of a water solution by either spraying, dipping, or roll coating the sponge. Where this is done, it will be necessary to dry the sponge in order to control the moisture content thereof in accordance with our invention.

In making up the trim assembly, we have found it desirable to secure the trim material to the sponge rubber prior to embossing. While substantially any cement or adhesive compatible with the materials of the trim assembly may be used since the fusion and embossing of the sponge rubber is independent thereof, we prefer to use a rubber latex in order to simultaneously introduce the desired amount of moisture into the sponge rubber. After extended development work to determine the best method for introducing the moisture, the following procedure was adopted: the back of the trim material was spray coated with a 60% solids latex emulsion at the same time that the surface of the sponge rubber upon which the trim material was to be assembled was roll coated with a 30% solids latex emulsion. The concentrations of the emulsions are stated in terms of weight percentage. The trim material and the sponge rubber were then assembled, the trim assemblies being then stacked back-to-back and enclosed with an impermeable, i.e., polyethylene, sheet. The polyethylene covering is used to prevent moisture from escaping from the assemblies during the period proceeding embossing. The trim assemblies were kept under the polyethylene covering for a period of at least about one-half hour before embossing in order to enable the moisture to penetrate uniformly throughout the sponge rubber. In this connection, we have found that uniform moisture distribution results in a higher quality embossment and reduces the heat cycle time. After the embossing operation, the assemblies were placed with their trim side down for a very short period in order to allow the vapors to escape through the back of the assembly before stacking. As has been described above, in embossing the assembly, the assembly is positioned upon a porous vapor escape sheet and the press is actuated to apply pressure and dielectrically generate heat in the sponge rubber.

While we have described our process in terms of a preferred embodiment, it should be noted that the conditioning agent may be introduced into the sponge rubber in any suitable manner including roll coating, spraying, tempering in a humidity chamber or by simultaneous introduction with the adhesive. Likewise, the embossing conditions may be varied in accordance with our disclosure in order to adapt conditions to specific trim assemblies. These and other modifications will be apparent to those skilled in the art and it should be understood that such modifications are intended as a part of our invention in accordance with the scope of the claims which follow.

We claim:

1. A process for dielectrically embossing a sponge rubber trim assembly comprising a sheet of trim material positioned on a layer of sponge rubber wherein heat and pressure are applied to form depressed areas in the assembly, the invention comprising the step of providing the rubber with a conditioning material consisting of at least one of the materials selected from the group consisting of water, methyl alcohol and the higher alcohols to enable the rubber to be selectively heated and fused in the depressed areas, the fused rubber acting as an adhesive to retain the embossed design in the trim material.

2. The process as set forth in claim 1 wherein said conditioning material is a liquid having non-adhesive properties.

3. The process as set forth in claim 1 wherein said conditioning material is water.

4. A method for dielectrically embossing a sponge rubber laminated assembly comprising a sheet of trim material positioned on a layer of sponge rubber to form depressed and elevated areas therein comprising the steps of introducing a liquid conditioning material consisting of at least one of the materials selected from the group consisting of water, methyl alcohol and the higher alcohols into the rubber, positioning the conditioned assembly within a dielectric press, and actuating the press to apply pressure to the assembly in desired areas and to selectively heat the rubber in the areas under compression, fusing the rubber in the areas under compression, retaining the fused rubber in the areas under compression to enable the rubber to act as the adhesive to form a pliable embossed line having a strong bond between the laminates of the assembly.

5. The method of making a decorative article having elevated and depressed portions comprising the steps of providing a trim material assembled with a sponge rubber riser, introducing a non-adhesive liquid conditioning material consisting of at least one of the materials selected from the group consisting of water, methyl alcohol and the higher alcohols within the rubber, positioning the resulting assembly within a dielectric press and upon a porous vapor escape sheet, applying pressure to the assembly to depress portions thereof in a desired pattern, selectively heating the sponge rubber to vaporize the conditioning material and fuse the sponge rubber in the depressed portions of the assembly, and permitting the vapors to tool the trim material in the elevated portions, the fused rubber remaining in the depressed portions.

6. The method as set forth in claim 5 wherein said conditioning material is water.

7. The method as set forth in claim 5 wherein the sponge rubber is provided with a small but sufficient amount of an additive material consisting of at least one of the materials selected from the group consisting of soaps and organic sulfonate type detergents to substantially eliminate fusion of the rubber in the elevated portions adjacent to the depressed portions.

8. The method for making a decorative sponge rubber article having elevated and depressed portions comprising the steps of introducing from about 2 to 7 percent by weight of water within the sponge rubber layer, assembling a trim material with the sponge rubber layer, applying a pressure of about 200 to 600 p.s.i. to the resulting assembly to depress portions thereof in a desired pattern, dielectrically heating the sponge rubber for a period of from about 6 to 60 seconds to vaporize the water and fuse the sponge rubber in the depressed portions, and permitting the vapors to tool the trim material in the elevated portions, retaining the fused rubber in the depressed portions to hold the trim material in the embossed pattern with a soft and strong bond.

9. The method in accordance with claim 8 wherein an alternating current field used across the assembly has a frequency of about 15 megacycles per second and at about 1000 volts.

10. The method as set forth in claim 9 wherein the dielectric heating is maintained for a period of from about 12 to 25 seconds and wherein the assembly is maintained under pressure for a hold time of up to 10 seconds.

11. In a method for making an embossed sponge rubber article having elevated and depressed portions, the steps of introducing into the sponge rubber an additive material consisting of at least one of the materials selected from the group consisting of soaps and organic sulfonate type detergents, introducing water within the sponge rubber in the amount of from about 4 to 5% by weight of the rubber, assembling a trim material with the sponge rubber, applying a pressure of about 400 p.s.i. to the resulting assembly to depress portions thereof in a desired pattern, dielectrically heating the sponge rubber for a period of from 12 to 25 seconds to vaporize the water and fuse the sponge rubber in the depressed portions, and permitting the vapors to tool the trim material in the elevated portions, the dielectric heating being achieved by applying an alternating current of approximately 1000 volts and at a frequency in the order of about 15 megacycles per second, the fused rubber remaining in the depressed portions to retain the embossed design.

12. The method as set forth in claim 11 wherein the water is introduced into the sponge rubber simultaneously with the step of assembling a trim material therewith by applying a water-rubber latex emulsion to the trim material and to the sponge rubber.

13. The method as set forth in claim 12 wherein the introduction of water and the assembly of the sponge rubber and trim material are simultaneously accomplished by spray coating the back of the trim material with a water-rubber latex emulsion of about 60% solids and by roll coating the surface of the sponge rubber with a water-rubber latex emulsion of about 30% solids, the resulting assemblies being permitted to temper for a period of at least one-half hour prior to embossing in order to permit the moisture to diffuse evenly through the sponge rubber.

14. The method for making an embossed sponge rubber article comprising a sheet of trim material secured to a layer of sponge rubber and having elevated and depressed areas thereon, comprising the steps of providing the sponge rubber with an additive material consisting of at least one of the materials selected from the group consisting of soaps and organic sulfonate type detergents, introducing water within the sponge rubber in the amount of from 2 to 7% by weight of the rubber, applying pressure to the assembly to depress portions thereof in a desired pattern, maintaining application of pressure while dielectrically heating the sponge rubber for a period sufficient to vaporize the water and fuse the sponge rubber in the depressed areas, retaining the fused rubber in the depressed areas and permitting the vapors to tool the trim material in the elevated areas, the dielectric heating being achieved by applying an alternating current of about 600 to 1200 volts, the fused rubber acting to retain the embossed design in the trim material.

References Cited in the file of this patent

UNITED STATES PATENTS

| | | |
|---|---|---|
| 1,812,970 | Mason | July 7, 1931 |
| 1,827,127 | Weamer | Oct. 13, 1931 |
| 2,068,759 | Nevin | Jan. 26, 1937 |
| 2,323,339 | Mason | July 6, 1943 |
| 2,434,527 | Untiedt | Jan. 13, 1948 |
| 2,476,282 | Castellan | July 19, 1949 |
| 2,521,808 | Taylor | Sept. 12, 1950 |
| 2,560,783 | Scott | July 17, 1951 |
| 2,575,251 | Arnold | Nov. 13, 1951 |
| 2,575,259 | Cox et al. | Nov. 13, 1951 |
| 2,582,449 | Millar et al. | Jan. 15, 1952 |
| 2,595,501 | Aicher | May 6, 1952 |
| 2,604,665 | Bosomworth | July 29, 1952 |
| 2,604,666 | Bosomworth | July 29, 1952 |
| 2,715,597 | Hosfield | Aug. 16, 1955 |

FOREIGN PATENTS

| | | |
|---|---|---|
| 706,109 | Great Britain | Mar. 24, 1954 |

UNITED STATES PATENT OFFICE

CERTIFICATE OF CORRECTION

Patent No. 2,946,713                           July 26, 1960

Peter P. Dusina, Jr., et al.

It is hereby certified that error appears in the printed specification of the above numbered patent requiring correction and that the said Letters Patent should read as corrected below.

Column 6, line 51, for "A process" read -- In a process --; column 7, line 9, for "The method of" read -- The method for --; column 8, line 15, for the claim reference numeral "12" read -- 11 --.

Signed and sealed this 4th day of April 1961.

(SEAL)
Attest: ERNEST W. SWIDER

Attesting Officer

ARTHUR W. CROCKER
Acting Commissioner of Patents